Nov. 8, 1938.　　　　A. L. HOLVEN　　　　2,135,512
SYSTEM OF CONTROL FOR EVAPORATING APPARATUS
Filed May 12, 1936　　　3 Sheets-Sheet 1
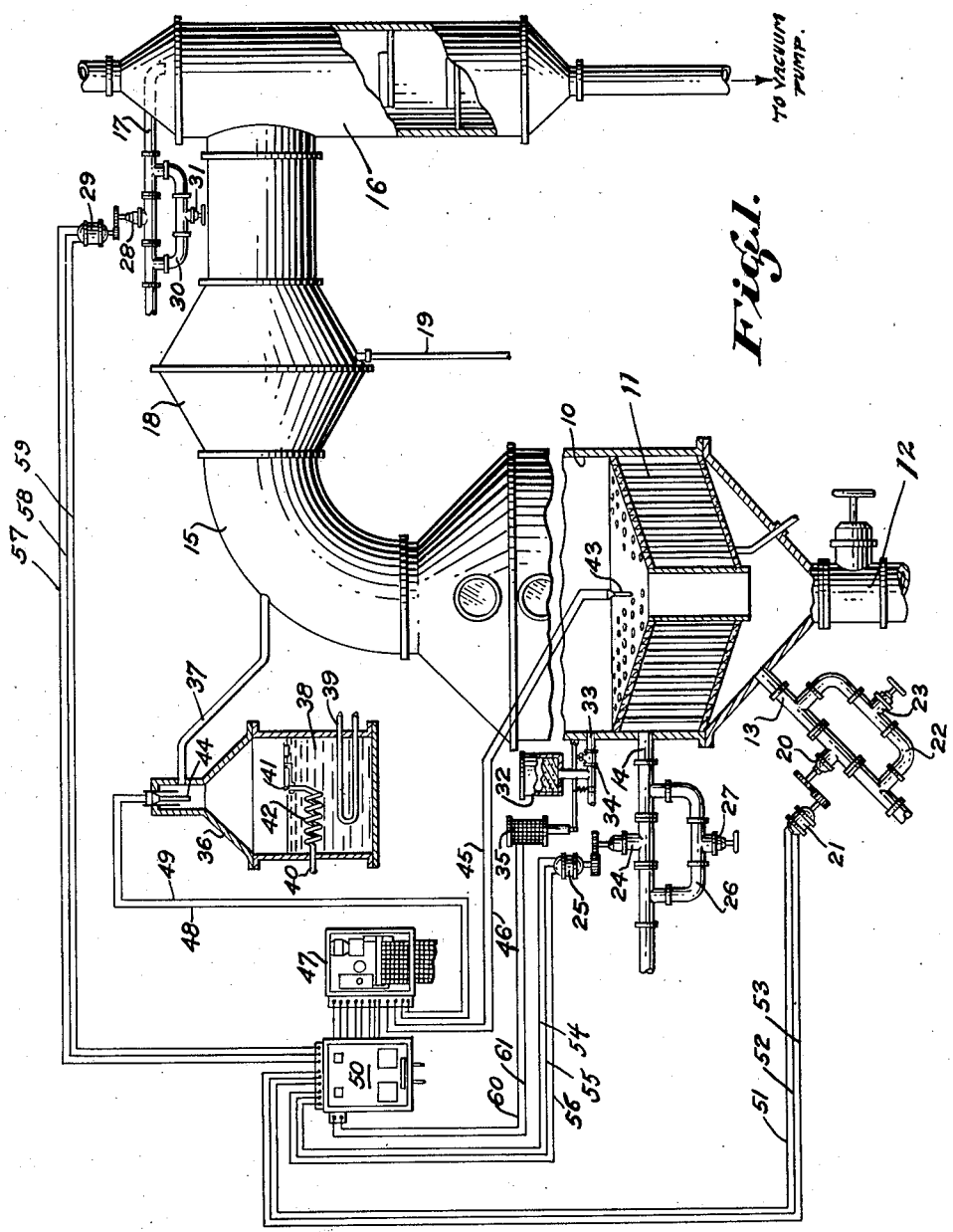
INVENTOR.
Alfred L. Holven.
BY
ATTORNEY.

Nov. 8, 1938.  A. L. HOLVEN  2,135,512
SYSTEM OF CONTROL FOR EVAPORATING APPARATUS
Filed May 12, 1936  3 Sheets-Sheet 2
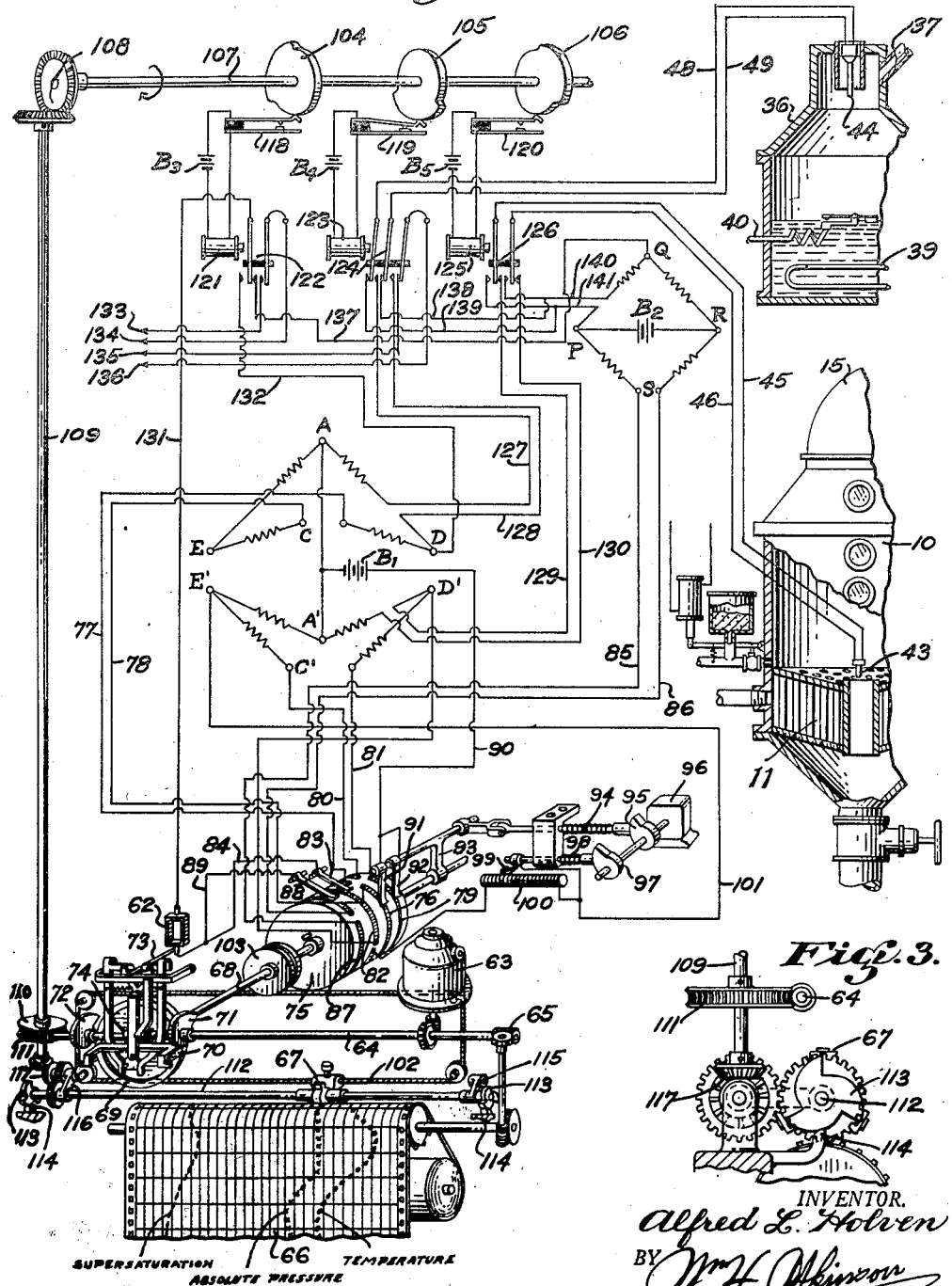
INVENTOR.
Alfred L. Holven
BY
ATTORNEY.

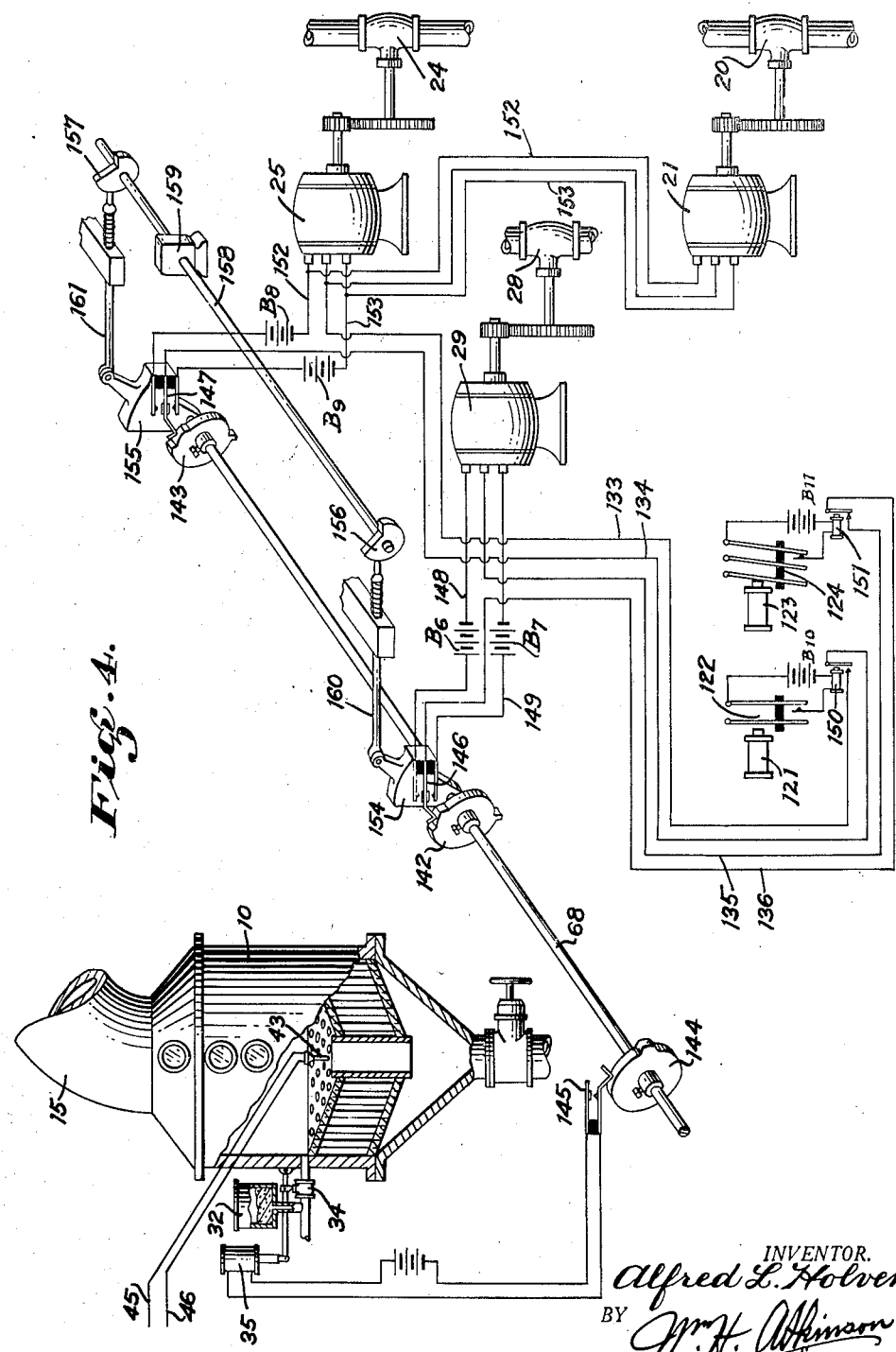

Patented Nov. 8, 1938

2,135,512

UNITED STATES PATENT OFFICE 2,135,512

SYSTEM OF CONTROL FOR EVAPORATING APPARATUS

Alfred L. Holven, Crockett, Calif.

Application May 12, 1936, Serial No. 79,400

17 Claims. (Cl. 159—44)

The present invention relates broadly to evaporating apparatus and more particularly to a method and apparatus for automatically controlling the degree of supersaturation of a solution undergoing crystallization in evaporating apparatus and is a continuation of my copending application for patent, entitled Method and apparatus for indicating the degree of supersaturation of a boiling solution, filed November 8, 1935, and identified by Serial Number 48,942.

The main object of this invention is to provide a system of control for evaporating and concentrating apparatus which will maintain the degree of supersaturation of a solution undergoing evaporation at optimum values during various stages of the evaporating period by controlling the variables whose several and combined effects determine the degree of supersaturation of the solution.

Another and more specific object of the invention is to provide a system and apparatus which will automatically control the degree of supersaturation of a boiling sugar solution by compensating for the interfering effects of each of the several variables involved; as for example, the absolute pressure within the evaporating pan, the rate of evaporation of the sugar solution, and/or the introduction of the sugar solution to the evaporating pan.

Another object of the invention is to provide a system of control for an evaporating apparatus which will regulate the ratio between the rate of evaporation and the rate of feed of the solution being supplied to the evaporating apparatus, and maintain such a ratio as may be required to produce the optimum supersaturation values regardless of variations in the absolute pressure existing within the evaporating apparatus during a boiling operation.

Another object of the present invention is to provide means whereby the absolute pressure under which a sugar or like solution being boiled may be automatically adjusted to such values as have been found to be best suited for each of the several stages of the evaporating or boiling period.

Another and further object of this invention is to regulate the rate of crystallization by controlling the two variables on which the crystallization rate is primarily dependent; namely, the boiling temperature and the degree of supersaturation.

A further object of the invention is to provide, in a sugar solution concentrating system, means which will automatically inject a measured quantity of seed grain for the purpose of inducing crystallization in the solution undergoing concentration at the instant when the proper degree of supersaturation has been attained.

While the apparatus herein disclosed and claimed may be used in any one of several industrial operations, the following description will be confined to an application of the invention in the control of sugar boiling operations, in which field the invention has been applied and successfully operated.

In the crystallization of cane sugar or sucrose on an industrial scale, both the quantity and quality of sugar crystallized from solution are dependent on the maintenance of the proper degree of supersaturation in the solution at various stages of the boiling process. Therefore an accurate measure of the existing degree of supersaturation, as well as a practicable means of maintaining the optimum degree of supersaturation at all times is of major importance. Both the quantity and quality of sugar crystallized from sugar solution are preeminently dependent on the degree of supersaturation existing at various stages of the boiling period. Therefore it is desirable to regulate the concentration of the solution so that the proper conditions for the most favorable crystallization of sucrose throughout the operating cycle shall prevail.

Supersaturation values have heretofore been derived by calculations in which the effect of absolute pressure, temperature of the boiling solution and the purity of the product, necessarily have been taken into account. From these calculations, however, it has obviously been impossible to effect an automatic control of the evaporating apparatus on the basis of the measured or calculated supersaturation values. In my copending application, Serial Number 48,942, I have disclosed a method and apparatus by which a continuous measurement and record of the supersaturation values may be automatically attained.

The method and means disclosed in said prior application for the determination of the degree of supersaturation are based on the inventor's discovery that the supersaturation of a boiling sugar solution is such a function of the boiling point of the sugar solution and the absolute pressure in the evaporating pan that it may be represented by the formula $$\frac{Tw-K}{Ts-K}=\tan\theta,$$

wherein $Tw$ and $Ts$ are respectively the boiling points of water and a sugar solution at the same absolute pressure. K is a reference temperature, the value of which is determined by the point at which the constant supersaturation line intersects the line representing a supersaturation coefficient of zero, the tan θ is the slope of a constant supersaturation line produced by plotting the boiling point of water against the boiling point of a sugar solution at the same absolute pressure. Such a plot, as disclosed in my prior application for patent, will produce a substantially straight line, which is representative of the coefficient of supersaturat'on, and inasmuch as there is but one slope or tan θ value corresponding to each degree of supersaturation, the value of tan θ may be taken as representing the degree of supersaturation of the boiling solution at all absolute pressures prevailing in the evaporating pan.

Since the present invention is based in part upon the novel discovery and principles disclosed in my aforesaid prior application, I utilized as far as possible the electrical circuits therein disclosed.

However, since the crystallization is affected by the viscosity of the solution as well as its degree of supersaturation, the electrical circuits disclosed in my aforesaid prior application have been elaborated to provide for such control of viscosity as has been found necessary. These supplementary features consist of means for controlling the absolute pressure as a means of regulating the boiling point to such value as will cause the boiling mass to have the desired viscosity.

For a better understanding of the invention reference should be had to the drawings, wherein there is shown by way of illustration and not of limitation, the preferred electrical circuits and apparatus by which the objects of the invention are attained.

In these drawings:

Figure 1 is a diagrammatic view showing my improved system of control as applied to a sugar solution evaporating system, Figure 2 is a diagrammatic view showing the measuring and control initiating apparatus and system of electrical connections contemplated by my present invention, Figure 3 is a fragmentary end view showing a detail of the apparatus, and Figure 4 is a diagrammatic view showing the system of connections and apparatus by means of which the various valves of the evaporating apparatus are controlled.

The principal factors which influence the degree of supersaturation of a boiling sugar solution and the rate at which sugar is crystallized therefrom, are the absolute pressure under which the boiling takes place, the rate at which steam or other heating medium is consumed by the heating surfaces, the rate at which sugar liquor is fed to the evaporating pan and the purity of the sugar solution. To effectively control the degree of supersaturation and/or the crystallization rate, and thereby attain the advantages attendant thereto, it is proposed to control and compensate for each of the several variables in the manner disclosed below. Compensation for variations in the purity of the sugar liquor undergoing concentration is automatically attained by means included in the supersaturation measuring and recording system disclosed in my aforementioned copending application and therefore will not be described in detail herein.

In Figure 1 of the drawings, there is shown in outline, an assembly of the apparatus and controlling elements of the present invention. As here illustrated, the numeral 10 designates an evaporating pan of the vacuum type having a steamheating unit 11 disposed therein. At the bottom of the evaporating pan 10 there is a suitable discharge valve 12 through which the contents of the pan 10 may be discharged when the crystallization is completed. Adjacent the valve 12, the vacuum pan 10 has a feed pipe 13 through which the sugar solution to be concentrated may be introduced into the pan. The steamheating unit 11 is adapted to be supplied with steam through a conduit 14 which connects with the interior thereof. At the top of the vacuum pan 10 there is an exhaust conduit 15 with a suitable condenser 16 having a cooling water supply conduit 17. The condenser 16, in addition to having the cooling water supply conduit 17 which furnishes cooling water thereto, may also be connected to a vacuum pump or other means (not shown) which will serve to maintain a subatmospheric pressure therein. Disposed in the conduit 15 there is a trap 18 which serves to prevent the escape of vapors from the vacuum pan 10, and leading from the trap 18 there is a drain pipe 19.

The sugar solution feed pipe 13 has a valve 20 which is adapted to be controlled by an electric motor 21, and forming a bypass about the valve 20 there is a conduit 22 having a manually controllable valve 23. The steam supply conduit 14 has a valve 24 which is likewise adapted to be controlled by an electric motor 25, and disposed in bypass relation to the valve 24 there is a conduit 26 having a manually controllable valve 27. A similar arrangement of valves is also employed in the cooling water supply conduit 17 by the provision of a valve 28 which is controlled by an electric motor 29 and about which there is arranged a by-pass conduit 30 having a manually controllable valve 31.

With the valve arrangements in the conduits 13, 14 and 17, as disclosed above, it will be understood that the entire flow of fluid therethrough may be controlled by the motor operated valves or by the manually controllable valves. It is also conceivable that the control of fluid through these conduits may be controlled by adjusting the manually controllable valves to provide for a minimum required flow of fluid and then effect a regulation of the ultimate flow by shading the flow one way or another by an operation of the motor controlled valves associated with these pipes or conduits.

For the purpose of introducing crystal forming seed into the evaporating pan 10 at the proper time, as contemplated by this invention, there is also provided a suitable grain seed receptacle 32 which is adapted to be discharged by suction through a conduit 33 that communicates with the interior of the vacuum pan 10. The conduit 33 is shown as having a normally closed valve 34 which is adapted to be opened by an electromagnetic means 35, as will hereinafter appear.

Since the operation of the present invention is based upon the inventor's discovery that the supersaturation of a boiling solution is a function of the boiling point of the sugar solution and the absolute pressure within the evaporating pan, and that it may be determined by the formula $$\frac{T_w - K}{T_s - K} = \tan \theta,$$

as previously set forth, the equipment also includes a pilot pan 36 in which water may be boiled during an operating cycle, at the same absolute pressure as that existing within the evaporating pan 10. The pilot pan 36 is maintained at the same absolute pressure as that existing within the vacuum pan 10 by virtue of a conduit 37 which connects the interior of the pilot pan 36 with the interior of the vacuum pan 10. Submerged in the water, designated by the numeral 38, within the pilot pan 36, there is a steam heating coil 39, and for the purpose of maintaining the constant level of water 38 within the pilot pan 36, there is a water supply conduit 40 having a float controlled valve 41 at the discharge end thereof. As here shown, the water supply conduit 40 is coiled at 42 to provide for a preheating of the water supplied to the pilot pan 36.

As a means for determining the temperature and/or obtaining an electrical value corresponding to the temperature existing within the vacuum pan 10, there is a suitable temperature responsive element 43 which is located within the vacuum pan 10, and in order to determine the temperature and/or obtain an electrical value corresponding to the temperature existing within the pilot pan 36, there is provided a suitable temperature responsive element 44. The temperature responsive elements 43 and 44 are adapted to produce values in resistance or potential which will control electrical balancing and measuring circuits, as will hereinafter appear. The temperature responsive element 43 is shown as connected by means of conductors 45 and 46 with the terminal board of an instrument enclosing housing, designated generally by the numeral 47 which contains the more sensitive measuring elements of the system, and the temperature responsive element 44 is shown as connected to the terminal board of the housing 47 by means of conductors 48 and 49. For the purpose of supporting and enclosing other elements of the control system, there is also shown a second housing 50 in which the other circuit controlling elements are enclosed.

Before proceeding with a more detailed description of the electrical control aspects and other features of the invention, it should be pointed out that the valve controlling motors 21, 25 and 29 are of the reversible type. They are therefore each shown as connected with the control circuits by means of three conductors. The motor 21 is connected to the controlling unit within the housing 50 by means of conductors 51, 52 and 53. The motors 25 and 29 are similarly connected to the controlling unit within the housing 50 respectively, by the conductors 54, 55, 56 and 57, 58, 59. The electromagnet 35 which controls the seed grain valve 34 is here shown as connected to the control equipment within the housing 50 by means of conductors 60 and 61.

Upon referring to Figure 2 of the drawings, it will be seen that the measuring and control initiating aspects of my present invention involve the use of a plurality of Wheatstone bridge circuits which are adapted to respond to the temperatures and/or other values determined by the temperature responsive elements 43 and 44, and when unbalanced these bridge circuits excite a galvanometer winding 62 which controls an automatic measuring and recording instrument of the Wheatstone bridge balancing type, such as is illustrated and described in Morris E. Leeds United States Patent No. 1,125,699, dated January 19, 1915. The bridge balancing mechanism described in this patent is old and well known in the art, and therefore a detailed description of its mode of operation is regarded as unnecessary. It will be sufficient for the purpose of the present description to state that the mechanism described in this prior art patent comprises a continuously rotating constant speed motor 63 which is adapted to drive a shaft 64 and through a suitable worm gear system 65, a recording chart 66 with which a print wheel 67 cooperates. The recording chart 66 is of the triple record type and is so designed and calibrated that supersaturation, absolute pressure and the boiling temperature of the massecuite may be recorded thereon. Disposed at a right angle to the shaft 64 there is a second shaft 68 that has a frictional driving disc 69 with which pivotally mounted friction shoes 70 are adapted to cooperate when pressure is exerted thereupon by either one of cams 71 and 72 which are carried by the motor driven shaft 64. The pivotally mounted friction shoes 70 are suspended upon a delicately mounted lever system that is adapted to be set in operation by a pointer or arm 73 which is moved by the potential responsive galvanometer winding 62. A cam 74 which is carried upon the shaft 64 also operates in conjunction with the friction shoe supporting leverage, as will be well understood from the description of this apparatus given in the above referred to Leeds patent.

In carrying out my present invention and for the purpose of controlling and measuring the degree of supersaturation of the solution, I use two Wheatstone bridge circuits, designated A E C D and A' E' C' D', which when balanced one against the other by means of the bridge balancing mechanism, will function in the manner described in my prior application to produce a value or indication corresponding to the degree of supersaturation of the solution undergoing concentration.

In addition to the above bridge circuits, I also employ a third Wheatstone bridge circuit P Q R S, which is adapted to be connected alternately to the temperature responsive elements 43 and 44 located respectively in the evaporating pan 10 and the pilot pan 36. For the purpose of automatically effecting an electrical balance in the above bridge circuits by means of the automatic balancing apparatus illustrated in the above identified Leeds patent, I provide a suitable insulated and rotatable drum 75, upon the shaft 68 which is adapted to be driven by the motor 63, and upon this drum I mount suitable resistances having sliding contacts which will have a relative movement between the ends of the resistance units as the drum 75 is rotated in one direction or another under the control of the galvanometer winding 62. In connection with the bridge circuit A E C D, I provide a resistance unit 76 which is connected at the point C by means of conductors 77 and 78, and in connection with the bridge circuit A' E' C' D', I provide a resistance unit 79 which is connected at the point C' by means of conductors 80 and 81. These resistance units 76 and 79, as described in my prior application, compensate for the variations in the reference temperature K of the previously given formula. In addition to the resistance units 76 and 79 there is also provided upon the drum 75 an additional resistance unit 82 which functions as a potentiometer winding between the bridge circuits A E C D and A' E' C' D', and from which a slideable contact 83 connects through a conductor 84 with the galvanometer winding 62. Also mounted upon the drum 75 and adapted to be connected into the bridge circuit P Q R S, by means of conductors 85 and 86, there is an additional resistance unit 87 which has a slideable contact 88 that connects through a conductor 89 with the galvanometer winding 62. The combined bridge circuits A E C D and A' E' C' D' are shown as excited by a battery $B_1$, one terminal of which is connected to the combined bridge circuits at the points A and A', and the other terminal of which is connected through a conductor 90 to sliding contacts 91 and 92, which engage the reference temperature compensating resistance units 78 and 79. In connection with the sliding contacts 91 and 92 it will be understood that as the drum 75 rotates the points at which these contacts engage the resistance units 78 and 79 will vary in accordance with the operation effected by the galvanometer winding 62. This, as suggested above, will effect a change in the bridge circuits A E C D and A' E' C' D', and compensate for the change in the reference temperature at different degrees of supersaturation.

In order to compensate for a purity change which takes place during a sugar boiling operation, I have shown the contacts 91 and 92 as mounted upon a support 93 which pivots about an extension of the shaft 68. This support 93 is controlled through a pusher rod 94 and a cam 95 which is moved by a clock mechanism or timing motor 96. The cam 95 is moved in timed relation with the boiling operation, and its design is such that it will move the contacts 91 and 92 a distance which has been found from experience to correspond to the normal change that takes place in the purity of the solution during a single cycle of operation or strike, as this operation is generally termed in the sugar boiling art. In addition to the cam 95, the clock mechanism 96 also serves to drive a second cam 97, which through a pusher rod 98 controls the position of a sliding contact 99 upon a slider resistance 100 which is connected in series with the resistance unit 82 and to the point E' of the bridge circuit A'E'C'D' by means of a conductor 101. The apparatus and the operation of the means controlled by the clock mechanism 96 is fully described and claimed in my copending application.

The position of the print wheel 67 upon the chart 66 is controlled by means of a continuous belt 102, one turn of which is wrapped about a drum 103 upon the shaft 68. With this arrangement it will be seen that as the bridge balancing mechanism rotates the shaft 68 in one direction or another, the print wheel 67 will be moved over the chart 66 in a direction and distance corresponding to the movement imparted to the belt 102. In carrying out the present disclosure, the print wheel 67 will have three identifying indicia, each one of which will correspond to a particular record being made at a predetermined time. While the indicia upon the print wheel 67 may be changed in the manner disclosed in the above Leeds patent, it is possible, because of the small number of changes required, to effect a change therein, as will hereinafter be described.

In controlling the evaporating apparatus in response to the existing degree of supersaturation and/or the absolute pressure and temperature within the evaporating pan, I propose to periodically connect one or the other Wheatstone bridge circuits into the system and to connect the temperature responsive elements 43 and 44 into one or more of the Wheatstone bridge circuits. These circuit changes are made in timed relation with the operation of the bridge balancing mechanism and include three switch operating cams, designated by the numerals 104, 105 and 106. These cams 104, 105 and 106 operate in unison and can therefore be mounted upon a single shaft 107. Under normal operating conditions these cams may make one complete revolution in three minutes, and since the shaft 64 may normally be adapted to rotate at about twenty revolutions per minute, it will be seen that the shaft 107 may be driven by means of a suitable reducing gear connection from the shaft 64. In the drawings, the shaft 107 is shown as connected through beveled gears 108 to a shaft 109 that carries a worm gear 110 which is driven by a worm 111 upon the end of the shaft 64. The reduction ratio between the worm wheel 110 and the worm 111 will under the assumed conditions be sixty to one. Since the cams 104, 105 and 106 are designed to control the circuits in response to definite existing conditions, it will be understood that the print wheel 67, with its three corresponding indicating characters, must also be changed so as to bring the character corresponding to each of these cams into operation upon the chart. As shown in the drawings, this is accomplished by extending the shaft 109 downwardly below the worm 111 and turning the print wheel 67 at a speed corresponding to the speed of the shaft 107.

The print wheel 67 in responding to the conditions to be recorded, will move laterally into different positions upon the chart 66. Therefore it is desirable that it be lifted from the chart to prevent smearing when changes are made in the circuits, as will hereinafter appear. One manner in which this may be accomplished is illustrated in the drawings, by mounting the print wheel 67 upon a shaft 112 and providing a three point cam 113 upon each end of this shaft. The shaft 112 is mounted so that it will move about an axis substantially in line with the belt 102. The three points upon the cams 113 will be positioned to cooperate with stationary abutments 114 so that when the shaft 112 is rotated, it will be elevated with the print wheel 67 and periodically dropped upon the chart 66 at a time when the bridge balancing mechanism has produced a balance in the particular bridge circuit with which it is connected, as will be determined by the cams 104, 105 and 106. In the drawings, the shaft 112 is shown as mounted upon the free ends of pivotally mounted links 115 and 116, and it is driven by means of a train of gears 117 which operate at a one to one ratio from the shaft 109. In operation it requires a little time to bring the Wheatstone bridges to a balanced condition. This may usually require about ten revolutions of the shaft 64, and therefore the three points upon the cams 113 will be so designed and positioned as to drop the print wheel 67 upon the chart 66 only after a sufficient time delay to permit a balancing of the bridge circuits. The relative position of the points upon the cams 113 and their relation to the abutments 114 and the indicia upon the print wheel 67 is further illustrated in Figure 3 of the drawings.

The above referred to circuit determining cams 104, 105 and 106 which, as previously stated, may complete an operation in approximately three minutes, operate respectively to close normally opened switches 118, 119 and 120. These latter switches are shown as controlling the circuits of batteries $B_3$, $B_4$ and $B_5$. However, it is to be understood that any other source of power may be provided. When the switch 118 is closed it forms an energizing circuit for a relay 121 which operates a double pole and double throw switch 122. The switch 119 controls the circuit of a relay 123 which operates a triple pole double throw switch 124, and the switch 120 controls the circuit of a relay 125 which operates a double pole double throw switch 126. In connection with the switches 122, 124 and 126, it should be stated that under proper conditions these switches might be operated directly by the cams 104, 105 and 106. When the cam 104 is in a position to close its associated switch 118, the circuits formed by the three switches 121, 123 and 125 will connect the temperature responsive element 44 with one leg of the bridge circuit A E C D through conductors 127 and 128. The remainder of this circuit being completed by the conductors 48 and 49 previously identified. At the same time the temperature responsive element 43 will be connected through its conductors 45 and 46 through the switch 126 and conductors 129 and 130 to a corresponding leg of the bridge circuit A' E' C' D'. The galvanometer winding 62 will be connected through conductor 131 and the left-hand blade of switch 122 through conductor 132 to the point D upon the bridge circuit A E C D. The other side of the galvanometer winding 62 will then be connected to a point intermediate the ends of the slide wires 76 and 79, and in series with the battery $B_1$ by means of the conductor 90 and its sliding contacts 91 and 92. This will complete a circuit identical with that disclosed in my copending application and the measuring circuits will be established to respond to the degree of supersaturation existing within the boiling sugar solution. At the same time these measuring circuits are established other circuits will also be established that will operate to make effective additional control apparatus which is to be described in more detail in connection with Figure 4 of the drawings. A portion of these additional circuits is represented on this figure of the drawings by the conductors 133, 134, 135 and 136.

When the cam 105 is in the position to close the switch 119, as illustrated, the galvanometer winding 62 will be connected through its conductor 131, the switch 122 and a conductor 137 to the point Q of the bridge circuit P Q R S, and the temperature responsive element 44 will be connected in one leg of this bridge circuit through its conductors 48 and 49, the switch 124 and conductors 138 and 139. The other side of the galvanometer winding 62 will then be connected through sliding contact 88 and conductor 89 to a point intermediate the slide wire resistance 87 which, as previously described, is connected at the point S of this latter bridge circuit. This will provide a bridge circuit which when balanced will give an indication and recording by means of which a control of the apparatus may be accomplished in response to the absolute pressure existing within the evaporating pan.

When the cam 106 is in a position to close the switch 120, the temperature responsive element 43 within the vacuum pan 10 will be connected into one leg of the Wheatstone bridge circuit P Q R S through its conductors 45 and 46, the switch 126 and conductors 140 and 141. At the same time the galvanometer winding 62 will remain connected at the point Q of this bridge circuit. The other side of the galvanometer winding 62 will likewise remain connected to a point intermediate the ends of the slide wire resistance 87, as has been also previously described. When the system is in this condition the bridge balancing apparatus will respond to the temperature existing within the evaporating apparatus and thus render the measuring and control system responsive to the temperature of the boiling massecuite.

Before proceeding with a detailed description of the control effecting aspects of the present invention, it should be stated that in addition to rotating the drum 75 with its slide wire resistances, the bridge balancing mechanism described, is also relied upon to initiate the operation of the remaining control apparatus when the conditions indicated by the circuits will require a change in the adjustment of the various controlling equipment.

As shown in Figure 4 of the drawings, the shaft 68, which is directly rotated by the bridge balancing mechanism, also carries suitable cams 142 and 143 which, as will presently appear, serve to control the valve operating motors 21, 25 and 29.

Before describing the motor controlling circuits illustrated in this figure of the drawings, it may be stated that the shaft 68 also carries a third cam 144 which is so positioned upon the shaft 68 that when the proper degree of supersaturation has been obtained within the evaporating pan after a start of a strike, it will close a normally open switch 145 to thus complete an energizing circuit for the electromagnet 35 and effect an opening of the seed grain controlling valve 34. At this point it should be stated that the valve 34 and its operating magnet 35 are so related and designed that after the valve 34 has been opened it will remain in this position a sufficient time to permit a full discharge of the contents of the container 32 into the evaporating pan 10 and then close, after which it cannot be again opened except by a resetting thereof, as in the event of a subsequent strike. The cams 142 and 143 are adjustably mounted upon the shaft 68 so that they will bear an operating relation to the particular slide wire resistance upon the drum 75 with which they are associated. Each of these cams have a three step surface, the middle one of which may, for the purpose of this description, be termed neutral. Associated with the cams 142 and 143 there are respectively two way switches 146 and 147. The switches 146 and 147 are so positioned with respect to their respective cams that they will be closed in one direction to complete a circuit when the cam moves in one direction from its neutral position, and closed in another direction to complete a different circuit when the cam moves in a reverse direction from its neutral position. The switch 146 is adapted to control the operation of the condenser feed water supply valve motor 29, and it is therefore connected in series with a circuit controlled by the right hand contact of the switch 124 which is operated by the previously described cam 105 through conductors 135 and 136, so that the valve 28 can only be operated when the apparatus is responsive to the absolute pressure existing within the evaporating apparatus. The circuit of the motor 29 is shown as having batteries $B_6$ and $B_7$ which, through conductors 148 and 149, control the direction of rotation of the motor 29 as provided by the circuits established in the switch 146 by movements of the cam 142. In connection with the circuit just described, it will be noted that the relays and switches, designated by the numerals 121 to 123 inclusive, have for convenience been shown in Figure 4 of the drawings. In this showing of the relays 121 and 123 all connections have been omitted that have no bearing on the motor circuits. In connection with the switches 122 and 124 controlled by these relays there is shown a modified form of motor circuit control which involves the use of time delay relays 150 and 151. The purpose of the time delay relays 150 and 151 is to produce a delay in the excitation of the controlled motor circuits for a period of time sufficient to permit the bridge balancing mechanism to come to a balance and thus prevent a hunting action. The motors 21 and 25 which respectively control the sugar solution feed to the vacuum pan and the rate of evaporation are adapted to be controlled by the switch 147 when the measuring aspects of this system are in operation, and therefore the switch 147 which is controlled by cam 143 is connected in series with the contacts of relay 150, which is associated with the right hand contact of the switch 122, by means of conductors 133 and 134, and for the purpose of supplying current and providing for a proper direction of rotation for the motors 21 and 25, these motors are shown as connected with batteries B8 and B9 through circuits 152 and 153. The switches 146 and 147 are shown in this figure of the drawings as mounted respectively upon supports 154 and 155, which are pivotally mounted to rotate about the shaft 68, and in this manner the position of these switches may be changed during a predetermined cycle of operation for the purpose of varying the characteristics effected by an operation of these switches. The predetermined cycle referred to may be considered to be the period of a normal strike, and since the changes desired, as will hereinafter appear, will be made in accordance with definite intervals of time, the supports 154 and 155 are adapted to be moved by cams 156 and 157 which are mounted upon a shaft 158 that is driven by a continuously operating timing motor or clock mechanism 159. The cam 156 operates upon a rod 160 that is connected to the support 154 and the design of this cam is such that it will move the switch 146 with respect to the associated cam 142 and provide for any predetermined absolute pressure change desired during the course of the boiling cycle. The cam 157 operates through a rod 161 that is connected to the support 155 and moves the switch 147 with respect to its associated cam 143 to change the position of the switch 147 and provide for a gradual change in the maintained supersaturation during the predetermined cycle of operation.

The operation of the system and apparatus contemplated by the invention will now be described.

To more clearly appreciate the operation of the present invention, a brief explanation of sugar boiling and the factors on which its success is dependent is desirable. Sugar boiling is customarily practiced as a batch process in which each batch is referred to as a strike. In the boiling of a strike every effort is concentrated on the production of the maximum yield of sugar crystals of a regular and required size. Since the attainment of this end is primarily dependent on controlling the rate of crystallization for the purities involved, the control of sugar boiling operations should be based on a control of the two variables by which the crystallization rate is affected; namely, the degree of supersaturation and the viscosity of the mother liquor. Since the boiling cycle consists of several periods, such as charging, concentrating of the charge, graining, setting the grain, enlarging the grain, and finishing the strike, and as the optimum conditions may vary for each of these operations, it is proposed by the present invention to control each of these variables in accordance with a predetermined cycle or program in a manner to be subsequently described.

Before describing in detail the operation of the several aspects of the invention, it is believed that a brief outline of the procedure followed in carrying out a complete boiling cycle or strike should be given. When the apparatus is set up and equipped, as illustrated in Figure 1 of the drawings, with the vacuum pan 10 empty and under an evacuated condition through the operation of the condenser 16 and the vacuum pump which operates in conjunction therewith, an initial charge of sugar liquor is introduced into the pan 10 through the conduit 13. At the same time steam will be admitted through the conduit 14 to the system heating unit 11 to cause the charge to boil. It will be understood that at this time the water 38 within the pilot pan 36 will also be boiling at an absolute pressure equal to that existing within the vacuum pan 10. After the initial charge of sugar liquor, which may range from ten to twenty-five tons, depending upon the size of the evaporating pan 10, has been introduced, the automatic control aspects of the invention will be set in operation. The evaporation of water from the charge will take place and the degree of supersaturation will gradually increase from the initial value up to the point where it has been determined a graining of the charge should occur. Under normal conditions the charge is introduced into the pan in an undersaturated condition, and the proper seeding or graining point for certain conditions and materials is considered to be when the charge has reached a supersaturation value of approximately 1.3. While the charge is boiling, the automatic pressure recording and controlling devices will operate to control the variables which determine the degree of supersaturation of the charge within the evaporating pan 10. As soon as the proper supersaturation value has been attained in the evaporating pan 10, the seed grain will be automatically introduced therein and the control of the steam, condensing water and sugar solution feed will continue to be automatically controlled throughout the remainder of the boiling period until a full strike, which may consist of sixty to eighty tons solids in a mother liquor of appropriate supersaturation has been attained, as will hereinafter appear. During the operation of the apparatus it will be assumed that the manually controlled bypass valves 20, 27 and 31 have been set to provide for a minimum flow through the conduits controlled thereby and that the increase and/or decrease through these conduits will be taken care of in an automatic manner by the motor controlled valves 20, 24 and 28.

Before describing the operation of the valve controlling apparatus, consideration will first be given to the operation of the bridge balancing mechanism and the means associated therewith, as illustrated in Figure 3 of the drawings, which serves to make the necessary circuit changes for rendering the apparatus operable to record and control the system in response to the degree of supersaturation existing within the pan, to record and control the system in response to the absolute pressure existing within the pan and to measure and record the temperature of the boiling massecuite periodically during the strike. Upon referring to Figure 3 of the drawings, it will be seen that when the cam 104 operates to close the switch 118, circuits will be established for the measuring and recording of the degree of supersaturation and the controlling of either the supply of steam to the vacuum pan 10 and/or the feed of the sugar solution to the pan. In connection with the relay switch 122, it will be noted that its operation will also complete a portion of the control circuit, designated by the numerals 133 and 134, which will be hereinafter described. In this operation the cam 104 will cause the relay 121 to operate and connect the galvanometer winding 62 to the dual Wheatstone bridge system A E C D and A' E' C' D'. The other side of the galvanometer winding 62 being completed through the conductor 84 and the sliding contact 83, which engages the slide wire resistance 82. During the interval that the cam 104 is operating, the cams 105 and 106 will be out of contact with their respective control switches 119 and 120, and as a result the switch 124 will be in its normal position where it will connect the temperature responsive element 44 into the bridge circuit A E C D, and the switch 126 will likewise be in its deenergized or normal position where it will connect the temperature responsive element 43 into the bridge circuit A' E' C' D', as previously described. This operation of the cam 104 will complete the circuits so as to render the measuring recording instrument aspect of the invention responsive to the degree of supersaturation existing within the vacuum pan 10, and as a result there will be recorded upon the chart 66 a value corresponding to that determined through a balancing of the described dual bridge circuit.

When the cam 105 comes into operating relation with its switch 119, as is shown in Figure 2 of the drawings, the switch 124 will be in its energized position, and as a result the temperature responsive element 44 will be connected into one leg of the Wheatstone bridge circuit P Q R S through the conductors 138, 140 and 139, 141. At the same time, due to the opening of the relay switch 122, the galvanometer winding 62 will be connected through conductors 131 and 137 to the point Q of this latter bridge circuit. The other side of the galvanometer winding 62 will then be connected through the conductor 89 and sliding contact 88 to the slide wire resistance 87 which is connected into the latter bridge circuit at the point S. This operation will disconnect the temperature responsive element 43 from the system, and since the temperature of the boiling water in the pilot pan 36 will vary as a function of the absolute pressure, the system will measure, record and control the system in response to the absolute pressure existing within the vacuum pan 10. During this interval it will be noted that the circuit which is completed through the conductors 135 and 136 to the control apparatus will be closed by the right-hand contact of the relay switch 124.

When the cam 106 comes into operation it will cause the relay 125 to be energized, and as a result the relay switch 126 will operate to disconnect the temperature responsive element 43 from the bridge circuit A' E' C' D', and connect it into one leg of the bridge circuit P Q R S. Under these conditions the connections of the galvanometer winding 62 will remain as previously described, and as a result the bridge balancing mechanism will operate to measure and record the temperature existing within the evaporating pan 10.

As the cams 104, 105 and 106 successively operate, it will be understood that the print wheel 67 which cooperates with the chart 66 will be moved across the chart to positions corresponding to the values determined by a balancing of the bridge circuits involved. At the same time the print wheel 67 will be turned with the shaft 112 to bring an indicia corresponding to the operating cam into an operative position over the chart 16 by means of the geared drive 117 which is driven, as above described, from the main driving shaft 64 of the bridge balancing mechanism. As the print wheel 67 is rotated in synchronism with the cams 104 and 105, it will by virtue of the cams 113 be periodically lifted and dropped with the shaft 112 upon which it is slidably keyed and thus an imprint of the indicia will be produced upon the chart 66. The variations in the positions of the similar imprints so made upon the moving chart 66 will then produce a series of like indicia through which a curve corresponding to the variations in the values recorded may be drawn.

Reference is now made to Figure 4 of the drawings for a detailed description of the operation of the valve controlling aspects of the present invention. In connection with this description it will be understood that the shaft 68 shown in this figure of the drawings, is a continuation of the shaft 68 upon which the drum 75 with the several bridge circuit balancing slide wire resistances is mounted. If it is now assumed that an initial charge has been placed in the evaporating pan 10 and that the charge is approaching the point of supersaturation where it has been determined the graining should occur, the cam 144 will have rotated to such a position that it will have closed the switch 145 associated therewith. This will energize the electromagnet 35 and open the graining valve 34. When the valve 34 is thus opened, the seeding charge of pulverized sugar crystals in the container 32 will be sucked into the vacuum pan 10 due to the vacuum existing therein, and after this has occurred the valve 34 will automatically close in the manner previously described, this being accomplished by providing means which will render the magnet 35 inoperative after it has been once energized after the start of a strike. In illustrating the position of the cams 142 and 143 upon the shaft 68, it has been assumed that the degree of supersaturation and the absolute pressure are at an optimum value for that particular period of the strike, and as a result the switches 146 and 147 controlled thereby are shown as in their neutral positions.

Now, with respect to the cam 142, if the absolute pressure within the pan should rise or fall to a value which would not produce a balance upon the Wheatstone bridge circuit with the cam 142 in the position shown, the switch 146 will be closed in one direction or another, depending upon in which direction the cam 142 has been rotated in producing a balance in the absolute pressure measuring bridge circuits. This will be determined by the amount and direction the absolute pressure has departed from the predetermined optimum value, and as a result the motor 29 will be operated to open or close the valve 28 and thus bring the absolute pressure back to the desired optimum value by controlling the flow of water to the condenser 16. When the switch 146 is thus operated, the circuits completed thereby for a control of the motor 29 in either direction will be completed through conductors 135 and 136, which are completed through the timed delay relay 151. At this point it will be noted that the relay 151 will be operative only when the absolute pressure cam 105 is in operation. Therefore this relay 151 is so designed that it will not close the motor circuits controlled thereby until the bridge balancing mechanism has had time to bring about a balance in the bridge circuit P Q R S. Then if a balance should occur in the bridge circuit P Q R S while the cam 142 is off its neutral position, as shown, the motor 29 will be energized to open or close the valve 28, depending upon which operation is necessary to bring the system back to the predetermined optimum value desired at that particular period of the operation.

Now, with respect to the cam 143, it will be noted that the motor circuits of the switch 147 controlled thereby is completed through the conductors 133 and 134 that are controlled by the time delay relay 150, which in turn is controlled by the relay switch 122. In other words, the time delay relay 150 is adapted to come into operation only when the system is operating in response to circuits established by an operation of the cam 104 to control the apparatus in response to the degree of supersaturation existing within the evaporating pan 10. If the degree of supersaturation measured and recorded under these conditions should bring about a balance in the combined bridge circuits when the cam 143 is displaced from the illustrated neutral position, the switch 147 will close in one direction or another, depending upon whether the degree of supersaturation is above or below the desired optimum value, and energize the motors 21 and 23, so as to effect an opening or a closing and/or a combined opening and closing of the valves 20 and 24 which control the sugar liquor feed to the evaporating pan 10 and the steam flow to the heating unit 11. For example, should the cam 143 be displaced in a clockwise direction, the switch 147 will operate to close its upper contacts and energize the motors 21 and 25, so as to close the valve controlled by the former motor and open the valve controlled by the latter motor. On a reverse displacement of the cam 143, the operation of the valves 20 and 24 will of course be reversed.

In the course of a normal strike it is desirable, because of the influence of supersaturation on the rate of crystallization, to provide for different degrees of supersaturation at various periods of the boiling cycle. To accomplish this result the switch 147 is mounted in a relatively movable manner with respect to its associated cam 143, so that the position of this switch may be changed from the position illustrated, or from any position it may have previously occupied. Since this change, as stated, is to be effected as the strike or boiling period proceeds, it will be seen that when the cam 157 is rotated by the timing motor or clock mechanism 159, it will effect the necessary timed movement of the switch 147 relative to the cam 143. This will maintain the supersaturation of the boiling solution at the predetermined values which have been found to be optimum for various periods of the boiling cycle.

In lieu of a simultaneous and/or alternate control of the rate of evaporation and the feed of the sugar solution in the manner above described, it may be more desirable under certain practical conditions to adopt a simpler alternative and automatically control one of said variables while manually controlling the other. For example, if conditions favor control of supersaturation by automatic regulation of the rate of evaporation, the flow of sugar liquor can be manually regulated by either valve 20 and/or 23, and the rate at which steam is admitted to the heating surfaces of the pan 10 may be controlled automatically through the valves 24 and/or 27 by the control mechanism illustrated by Figures 2 and 4 of the drawings. If on the other hand it becomes preferable to control the degree of supersaturation by an automatic regulation of the flow of sugar liquor to the vacuum pan, the rate at which steam is furnished to the heating units can be manually regulated by the valves 24 and/or 27. Under these latter conditions the flow of feed liquor to the pan 10 will be automatically regulated through the valve 20 and/or 23 by the control mechanism shown in Figures 2 and 4 of the drawings.

During the boiling of a strike in which the sugar liquor may for the purpose of illustration be assumed to have a purity of 90°, the purity of the mother liquor will gradually drop from its initial value of 90° down to approximately 80° by the time that the strike is finished. This changing purity of the mother liquor has a profound effect on the supersaturation value, and unless proper compensation for purity changes is made, serious errors in control will result. The means provided for this purpose herein described and illustrated are fully disclosed and claimed in my previous application. However, for the purpose of completing the present description there follows an outline of the operation of this feature. A decrease in the purity of the mother liquor from 90° to 80° in a predetermined interval of time, as suggested above, will be appropriately taken care of by the design of the cams 95 and 97. As shown in Figure 2, the cam 95 serves to rotate the pivotally supported contacts 91 and 92 with respect to the slide wires 76 and 79 with which they respectively contact by an amount sufficient to compensate for the effect of purity on the reference temperature K, as disclosed in my prior application. Moving in synchronism with the cam 95 is cam 97. Cam 97 shifts the position of contact 99 upon the slide wire 100 by an amount sufficient to compensate for the effect of purity on the point at which slide wire 82 upon the drum 75 will come to rest with respect to contact 83 for any given supersaturation value. By such means the interfering effects of purity changes are automatically compensated for, and as a result the control effected is responsive to the true supersaturation values of the solution.

The above illustration has briefly described the operation of a control mechanism by means of which the supersaturation of a boiling solution may be controlled in accordance with any predetermined cycle irrespective of any and all variations in either absolute pressure or purity of the mother liquor. However, since the rate of crystallization is also greatly affected by the viscosity of the solution, a complete control of the sugar crystallization will also include means for controlling the viscosity of the solution as well as its supersaturation. The required changes and regulation in the viscosity of the boiling massecuite may be brought about by changes in the boiling temperature. The boiling temperature, as is well known, is dependent on the prevailing absolute pressures, and therefore to effect predetermined changes in the absolute pressure and thus control the viscosity of the solution during the course of a boiling cycle, the switch 146 is mounted in a relatively movable manner with respect to its cam 142 so that the position of this switch may be changed from the position illustrated, or from any position it may have previously occupied. As this change is to be effected as the strike proceeds, the cam 156 which is rotated by the clockwork mechanism 159 will effect the necessary timed movement of switch 146 relative to cam 142 in order to shift the absolute pressure control point in accordance with any predetermined cycle. It will be understood that certain changes in absolute pressure may also be resorted to as a means for changing the rate of evaporation, as well as for a regulation of the viscosity of the solution.

It is obvious that by the above disclosed means it is possible to automatically control or compensate for each of the several variables on which the rate of crystallization of a boiling sugar solution is dependent. The controls of such variables are based on a novel method and means of automatically indicating and recording both the degree of supersaturation and the absolute pressure under which said sugar solution is boiling when the supersaturation measurement is being made.

While I have described my invention as applied to the control of sugar boiling operations, it is to be understood that it may also be applied to other industrial operations in which similar factors are involved. Although I have described my invention in detail and used certain specific terms and examples therein, it is to be understood that the present disclosure is illustrative rather than restrictive and that modifications may be made therein without departing from the spirit or the scope of the claims appended hereto.

Having thus described my invention, what I claim and desire to secure by Letters Patent is:—

1. In a system of control for evaporating apparatus, the combination of an evaporating pan in which a solution to be concentrated is placed, a fluid conduit for admitting a solution to be boiled to said evaporating pan, a steam heating unit within said pan for maintaining the solution at a boiling temperature, a fluid conduit for admitting steam to said heating unit, a pilot pan in which water is boiled constructed and arranged to operate at the same absolute pressure as that prevailing within the evaporating pan, a temperature responsive resistance within said evaporating pan, a potential producing bridge circuit in one leg of which said temperature responsive resistance is connected, a second temperature responsive resistance in said pilot pan, a second potential producing bridge circuit in one leg of which said latter temperature responsive resistance is connected, said two bridge circuits being energized from a common source of potential, motor operated valves in each of said fluid conduits for controlling the flow of solution and steam through the respective conduits, an electrical potential measuring means connected between said bridge circuits responsive to the conditions of balance or unbalance between the potentials produced by said bridge circuits as determined by the temperature responsive resistances thereof for controlling the operation of said motor operated valves to maintain a predetermined degree of supersaturation of the solution in the evaporating pan during a solution evaporating cycle.

2. In a system of control for evaporating apparatus, the combination of an evaporating pan in which a solution to be concentrated is boiled, a pilot pan in which water is boiled at the same absolute pressure as that existing within the evaporating pan, thermosensitive resistance located in said evaporating pan and in said pilot pan respectively responsive to the temperatures existing in said pans, two bridge circuits one associated with each of said resistances, a source of electrical energy common to each of said bridge circuits, a galvanometer connected between a terminal of each of said bridge circuits responsive to any potential difference existing therebetween, a variable resistance connected in series with said galvanometer and between said bridge circuits, means controlled by said galvanometer adapted to adjust the value of said variable resistance to produce a balance between said bridge circuits, the adjustment of said variable resistance being dependent upon the degree of supersaturation of the solution within the evaporating pan, a grain containing chamber having a normally closed conduit communicating with the interior of said evaporating pan, and means controlled by said last means adapted to temporarily open said conduit when the supersaturation of the solution within said evaporating pan reaches a predetermined value.

3. In a system of control for evaporating apparatus, the combination of an evaporating pan in which a solution to be concentrated is boiled, a pilot pan in which water is boiled at the same absolute pressure as that existing within the evaporating pan, thermosensitive resistance located in said evaporating pan and in said pilot pan respectively responsive to the temperatures existing in said pans, two interconnected bridge circuits one associated with each of said resistances adapted to produce a potential representative of the concentration of the solution in said evaporating pan, a source of electrical energy common to each of said bridge circuits, a galvanometer connected between a terminal of each of said bridge circuits responsive to the potential produced by said interconnected bridge circuits, a seed grain containing chamber having a normally closed conduit communicating with the interior of said evaporating pan, and means controlled by said galvanometer adapted to temporarily open said conduit when the concentration of the solution within said evaporating pan reaches a predetermined value.

4. In a system of control for evaporating apparatus, the combination of an evaporating pan in which a solution to be concentrated is placed, a pilot pan constructed and arranged to boil a solvent for the solution at the same absolute pressure as that prevailing within the evaporating pan, a steam heating unit within said evaporating pan for maintaining the solution at a boiling temperature, a fluid conduit for admitting steam to said heating unit, a condenser connected with said evaporating pan for maintaining a predetermined absolute pressure therein, a fluid conduit for admitting condensing water to said condenser to control the operation thereof, thermosensitive means within said evaporating pan and in said pilot pan, valves for controlling the flow of steam to said steam heating unit and the flow of cooling water to said condenser, a bridge circuit in one leg of which each of said thermosensitive means is adapted to be connected, galvanometer means connected in said bridge circuit adapted to operate in response to conditions of unbalance established in said bridge circuit by either one of said thermosensitive means for controlling the operation of said valves, and means for alternately connecting said thermosensitive means into said bridge circuit, whereby said galvanomoter means will alternately control said valves to maintain a predetermined absolute pressure and temperature condition within the evaporating pan.

5. In a system of control for evaporating apparatus, the combination of an evaporating pan in which a solution to be concentrated is boiled, a pilot pan in which water is boiled at the same absolute pressure as that existing within the evaporating pan, thermosensitive means located within said vacuum pan and within said pilot pan responsive to the temperatures existing in each of said pans, means associated with said thermosensitive means adapted to measure the degree of supersaturation of the solution within the evaporating pan, a grain containing chamber having a normally closed conduit communicating with the interior of said evaporating pan, and means responsive to said last means for opening said conduit when the supersaturation of the solution within said evaporating pan reaches a predetermined value.

6. In a system of control for evaporating apparatus, the combination of an evaporating pan in which a solution to be concentrated is boiled, a pilot pan in which water is boiled at the same absolute pressure as that existing within the evaporating pan, a thermosensitive resistance located within said evaporating pan and within said pilot pan responsive to the temperatures existing in each of said pans, a Wheatstone bridge circuit associated with each of said resistances, said bridge circuits being interconnected through a common source of electromotive force, a galvanometer connected to and sensitive to any potential difference developed between said bridge circuits, means controlled by said galvanometer adapted to automatically adjust said bridge circuits and maintain a zero potential difference therebetween, the adjustment effected by said means being dependent upon the degree of supersaturation of the boiling solution, a fluid conduit communicating with the interior of said evaporating pan having an electrically operated valve for controlling the admission of the solution to said pan during the course of a boiling cycle, and means controlled by said bridge adjusting means for controlling the operation of said electrically operated valve to maintain predetermined degrees of supersaturation in said sugar solution during the boiling cycle.

7. In a system of control for evaporating apparatus, the combination of an evaporating pan in which a solution to be concentrated is boiled, a pilot pan in which water is boiled at the same absolute pressure as that existing within the evaporating pan, a steamheating unit for maintaining a boiling temperature within said evaporating pan, a thermosensitive resistance located within said evaporating pan and within said pilot pan responsive to the temperatures existing in each of said pans, a Wheatstone bridge circuit associated with each of said resistances, said bridge circuits being interconnected through a common source of electromotive force, a galvanometer connected to and sensitive to any potential difference developed between said bridge circuits, means controlled by said galvanometer adapted to automatically adjust said bridge circuits and maintain a zero potential difference therebetween, the adjustment effected by said means being dependent upon the degree of supersaturation of the solution within the evaporating pan, a steam conduit having an electrically operated valve for controlling the flow of steam to said heating unit during the course of a boiling cycle, and means controlled by said bridge adjusting means for controlling the operation of said electrically operated valve to maintain a predetermined degree of supersaturation in said solution during the boiling cycle.

8. In a system of control for evaporating apparatus, the combination of an evaporating pan, a pilot pan in which water is boiled at the same absolute pressure as that existing within the evaporating pan, a heating means for said evaporating pan, a circuit consisting of two Wheatstone bridges energized from a common source of electromotive force, a resistance in one of said bridges variable in accordance with the temperature existing within said pilot pan, a resistance in a corresponding position in the other of said bridges variable in accordance with the temperature existing within the evaporating pan, a galvanometer connected between said two bridges responsive to the condition of balance or unbalance between the potentials developed by said Wheatstone bridges, and means responsive to said galvanometer for controlling the vacuum pan heating means, whereby the rate of evaporation will be determined by the degree of supersaturation of the solution during a boiling cycle.

9. In a system of control for evaporating apparatus, the combination of an evaporating pan having a conduit through which a solution may be introduced into the pan during a boiling cycle, a pilot pan in which water is boiled at the same absolute pressure as that existing within the evaporating pan, a circuit consisting of two Wheatstone bridges energized from a common source of electromotive force, a resistance in one of said bridges variable in accordance with the temperature existing within said pilot pan, a resistance in a corresponding position in the other of said bridges variable in accordance with the temperature existing within the evaporating pan, a galvanometer connected between said two bridges responsive to the condition of balance or unbalance between the potentials developed by said Wheatstone bridges, and means responsive to said galvanometer for controlling the introduction of the solution into said evaporating pan, whereby the feed of the solution to the evaporating pan will be determined by its degree of supersaturation during a boiling cycle.

10. In a system for controlling the viscosity of a solution in an evaporating apparatus, the combination of an evaporating pan in which a solution to be concentrated is boiled at a controlled absolute pressure, a pilot pan in which water is boiled at the same absolute pressure as that existing within the evaporating pan, a temperature responsive resistance located within said pilot pan, a Wheatstone bridge circuit in one leg of which said thermoresponsive resistance element is connected, an adjustable slide wire resistance in the opposite leg of said Wheatstone bridge circuit, a source of potential for exciting said bridge circuit, a galvanometer winding connected across said bridge circuit with one of its connections adjustable intermediate the ends of said slide wire resistance, a bridge balancing device responsive to said galvanometer winding for adjusting the position of contact of said galvanometer winding upon said slide wire resistance, the position of contact upon said slide wire resistance being a measure of the absolute pressure existing within said evaporating pan, means operated by said bridge balancing device for controlling the absolute pressure within said evaporating pan, and means cooperating with said last means for determining and changing the value of the absolute pressure to be maintained by said last means during an operating cycle.

11. In a system of control for evaporating apparatus, the combination of an evaporating pan in which a solution to be concentrated is boiled, a pilot pan in which water is boiled at the same absolute pressure as that existing within the evaporating pan, and thermosensitive resistance located within said evaporating pan and within said pilot pan responsive to the temperature existing in each of said pans, two interconnected Wheatstone bridge circuits each one of which includes in one leg thereof one of said thermosensitive resistances, a source of excitation for said bridge circuits connected at one side to like points upon said bridge circuits and at its other side to corresponding opposite points upon said bridge circuits, a potentiometer winding connected to points of opposite polarity between said two bridge circuits, a galvanometer connected between a point upon one of said bridge circuits and a point adjustable along said potentiometer winding, whereby the potentials developed by said bridge circuits may be balanced one against the other by an adjustment in the connection of the galvanometer to said potentiometer winding, means controlled by said galvanometer adapted to automatically adjust the point of connection of the galvanometer circuit upon said potentiometer winding to produce a zero potential difference between said bridge circuits, the adjustment effected by said means being dependent upon the degree of supersaturation of the solution within the evaporating pan, a solution conduit communicating with the interior of said evaporating pan having a valve for controlling the admission of the solution to said pan during the course of a boiling cycle, and means responsive to said galvanometer for controlling said valve to regulate the flow of solution to said evaporating pan as determined by the degree of supersaturation in the solution during the boiling cycle.

12. In a system of control for evaporating apparatus, the combination of an evaporating pan in which a solution to be concentrated is boiled, a pilot pan in which water is boiled at the same absolute pressure as that existing within the evaporating pan, a steamheating unit for maintaining a boiling temperature within said evaporating pan, and thermosensitive resistance located within said evaporating pan and within said pilot pan responsive to the temperature existing in each of said pans, two interconnected Wheatstone bridge circuits each one of which includes in one leg thereof one of said thermosensitive resistances, a source of excitation for said bridge circuits connected at one side to like points upon said bridge circuits and at its other side to corresponding opposite points upon said bridge circuits, a potentiometer winding connected to points of opposite polarity between said two bridge circuits, a galvanometer connected between a point upon one of said bridge circuits and a point adjustable along said potentiometer winding, whereby the potentials developed by said bridge circuits may be balanced one against the other by an adjustment in the connection of the galvanometer to said potentiometer winding, means controlled by said galvanometer winding adapted to automatically adjust the point of connection of the galvanometer winding circuit upon said potentiometer winding to produce a zero potential difference between said bridge circuits, the adjustment effected by said means being dependent upon the degree of supersaturation of the solution within the evaporating pan, a steam conduit having an electrically operated valve for controlling the flow of steam to said heating unit during the course of a boiling cycle, and means controlled by said galvanometer and said connection adjusting means for controlling the operation of said electrically operated valve to maintain a predetermined degree of supersaturation in said solution during the boiling cycle.

13. In a system of control for evaporating apparatus, the combination of an evaporating pan in which a solution to be concentrated is boiled, a pilot pan in which water is boiled at the same absolute pressure as that existing within the evaporating pan, and thermosensitive resistance located within said evaporating pan and within said pilot pan responsive to the temperature existing in each of said pans, two interconnected Wheatstone bridge circuits each one of which includes in one leg thereof one of said thermosensitive resistances, a common source of excitation for said bridge circuits connected at one side to like points upon each of said bridge circuits and at its other side to corresponding opposite points upon said bridge circuits, a potentiometer winding connected to points of opposite polarity between said two bridge circuits, a galvanometer connected between a point upon one of said bridge circuits and a point adjustable along said potentiometer winding, whereby the potentials developed by said bridge circuits may be balanced one against the other by an adjustment in the connection of the galvanometer to said potentiometer winding, means controlled by said galvanometer adapted to automatically adjust the point of connection of the galvanometer circuit upon said potentiometer winding to produce a zero potential difference between said bridge circuit, the adjustment effected by said means being dependent upon the degree of supersaturation of the solution within the evaporating pan, a fluid conduit communicating with the interior of said evaporating pan having an electrically operated valve for controlling the admission of the solution to said pan during the course of a boiling cycle, and means responsive to said galvanometer for controlling the operation of said electrically operated valve to maintain a predetermined degree of supersaturation in the solution during the boiling cycle.

14. In a system of control for evaporating apparatus, the combination of an evaporating pan in which a solution to be concentrated is boiled, a pilot pan in which water is boiled at the same absolute pressure as that existing within the evaporating pan, a steamheating unit for maintaining a boiling temperature within said evaporating pan, and thermosensitive resistance located within said evaporating pan and within said pilot pan responsive to the temperature existing in each of said pans, two interconnected Wheatstone bridge circuits, each one of which includes in one leg thereof one of said thermosensitive resistances, a common source of excitation for said bridge circuits connected at one side to like points upon each of said bridge circuits and at its other side to corresponding opposite points upon said bridge circuits, a potentiometer winding connected to points of opposite polarity between said two bridge circuits, a galvanometer connected between a point upon one of said bridge circuits and a point adjustable along said potentiometer winding, whereby the potentials developed by said bridge circuits may be balanced one against the other by an adjustment in the connection of the galvanometer to said potentiometer winding, means controlled by said galvanometer adapted to automatically adjust the point of connection of the galvanometer circuit upon said potentiometer winding to produce a zero potential difference between said bridge circuits, the adjustment effected by said means being dependent upon the degree of supersaturation of the solution within the evaporating pan, a steam conduit having an electrically operated valve for controlling the flow of steam to said heating unit during the course of a boiling cycle, and means responsive to said galvanometer for controlling the operation of said electrically operated valve to maintain a predetermined degree of supersaturation in the solution during the boiling cycle.

15. In a system of control for evaporating apparatus, the combination of an evaporating pan in which a solution to be concentrated is boiled, a pilot pan in which water is boiled at the same absolute pressure as that existing within the evaporating pan, and thermosensitive resistance located within said evaporating pan and within said pilot pan responsive to the temperature existing in each of said pans, two interconnected Wheatstone bridge circuits, each one of which includes in one leg thereof one of said thermosensitive resistances, a common source of excitation for said bridge circuits connected at one side to like points upon each of said bridge circuits and at its other side to corresponding opposite points upon said bridge circuits, a potentiometer winding connected to points of opposite polarity between said two bridge circuits, a galvanometer connected between a point upon one of said bridge circuits and a point adjustable along said potentiometer winding, whereby the potentials developed by said bridge circuits may be balanced one against the other by an adjustment in the connection of the galvanometer to said potentiometer winding, means controlled by said galvanometer adapted to automatically adjust the point of connection of the galvanometer circuit upon said potentiometer winding to produce a zero potential difference between said bridge circuits, the adjustment effected by said means being dependent upon the degree of supersaturation of the solution within the evaporating pan, a fluid conduit communicating with the interior of said evaporating pan having an electrically operated valve for controlling the admission of the solution to said pan during the course of a boiling cycle, and means operated by said galvanometer connection adjusting means for controlling the operation of said electrically operated valve to maintain a predetermined degree of supersaturation in the solution during the boiling cycle.

16. In a system of control for evaporating apparatus, the combination of an evaporating pan in which a solution to be concentrated is boiled, a pilot pan in which water is boiled at the same absolute pressure as that existing within the evaporating pan, a steamheating unit for maintaining a boiling temperature within said evaporating pan, and thermosensitive resistance located within said evaporating pan and within said pilot pan responsive to the temperature existing in each of said pans, two interconnected Wheatstone bridge circuits, each one of which includes in one leg thereof one of said thermosensitive resistances, a common source of excitation for said bridge circuits connected at one side to like points upon each of said bridge circuits and at its other side to corresponding opposite points upon said bridge circuits, a potentiometer winding connected to points of opposite polarity between said two bridge circuits, a galvanometer connected between a point upon one of said bridge circuits and a point adjustable along said potentiometer winding, whereby the potentials developed by said bridge circuits may be balanced one against the other by an adjustment in the connection of the galvanometer to said potentiometer winding, means controlled by said galvanometer adapted to automatically adjust the point of connection of the galvanometer circuit upon said potentiometer winding to produce a zero potential difference between said bridge circuits, the adjustment effected by said means being dependent upon the degree of supersaturation of the solution within the evaporating pan, a steam conduit having an electrically operated valve for controlling the flow of steam to said heating unit during the course of a boiling cycle, and means operated by said galvanometer connection adjusting means for controlling the operation of said electrically operated valve to maintain a predetermined degree of supersaturation in the solution during the boiling cycle.

17. In a system for controlling the viscosity of a solution in an evaporating apparatus, the combination of an evaporating pan in which a solution to be concentrated may be boiled at a controlled absolute pressure, a pilot pan in which water may be boiled at the same absolute pressure as that existing within the evaporating pan, a water cooled condenser for controlling the absolute pressure within said evaporating pan, a source of condensing water for said condenser, a Wheatstone bridge circuit having a resistance in one leg thereof which is variable in accordance with the absolute pressure within said pilot pan, an adjustable slide wire resistance in the opposite leg of said Wheatstone bridge circuit, a source of potential for exciting said bridge circuit, a galvanometer winding connected to the opposed legs of said bridge circuit with one of its connections adjustable intermediate the ends of said slide wire resistance, an automatic bridge balancing device responsive to said galvanometer winding for adjusting the position of contact of said galvanometer winding upon said slide wire resistance, the position of contact upon said slide wire resistance being a measure of the absolute pressure existing within said evaporating pan, means responsive to said bridge balancing device for controlling the flow of condensing water to said condenser, whereby a predetermined absolute pressure will be maintained within said evaporating pan during the operating cycle, and means operating in timed relation with the solution boiling cycle for determining the value of absolute pressure at which said last means will be responsive to said bridge balancing means, whereby the system will operate to maintain different values of absolute pressure within the evaporating pan during different periods of the boiling cycle.

ALFRED L. HOLVEN.